United States Patent [19]

Yip

[11] Patent Number: 5,366,808
[45] Date of Patent: Nov. 22, 1994

[54] WATER REDUCIBLE SILICONE WEATHERSTRIP COATING

[75] Inventor: Chak-Kai Yip, North York, Canada

[73] Assignee: General Electric Company, Waterford, N.Y.

[21] Appl. No.: 78,704

[22] Filed: Jun. 17, 1993

[30] Foreign Application Priority Data

Jun. 25, 1992 [CA] Canada .................. 2072288

[51] Int. Cl.$^5$ ............................. B32B 9/04
[52] U.S. Cl. ..................... 428/447; 524/767; 524/837; 525/477; 528/38
[58] Field of Search ......... 524/837, 767; 525/477; 528/38; 428/447

[56] References Cited

U.S. PATENT DOCUMENTS

| | | | |
|---|---|---|---|
| 2,810,704 | 10/1957 | Krantz | 260/33.6 |
| 4,233,428 | 11/1980 | Endo | 525/507 |
| 4,252,933 | 2/1981 | Sumida | 528/33 |
| 4,600,436 | 7/1986 | Traver et al. | 106/3 |

FOREIGN PATENT DOCUMENTS 2034851 1/1991 Canada .

Primary Examiner—Melvyn I. Marquis

[57] ABSTRACT

A water reducible weatherstrip coating comprising a three component system including a silicone emulsion base, an adhesion promoter and a catalyst. The coating provides slippery films having good freeze release properties and abrasion resistant properties while avoiding the problems associated with solvent based coatings.

31 Claims, No Drawings

WATER REDUCIBLE SILICONE WEATHERSTRIP COATING

BACKGROUND OF THE INVENTION

This invention relates to coating composition systems suitable for use as weatherstrip coatings. In particular, it relates to silicone compositions that are water reducible and, when applied to common weatherstrip material such as EPDM rubber, provide a coating that possesses properties such as low coefficient of friction, improved abrasion resistance and freeze-release.

A wide variety of OH-terminated diorganosiloxane coatings having freeze-release properties are known and are readily available. Most of the coatings are used to treat paper and other porous substrates such that the adhesion of-the coating to the substrate is primarily based on physical anchorage. On non-porous substrates such as plastics and rubber surfaces, adhesion of these coatings is poor. Furthermore, these coatings have little resistance to removal by abrasion. Because of these problems coating systems for non-porous substrates often require two process steps including the application of a primer followed by the application of the coating material as is taught in for example U.S. Pat. No. 4,233,428 of Endo.

One step coating compositions have been taught by Sumida in U.S. Pat. No. 4,252,933 issued Feb. 24, 1981. Further, an amine functional silane modified epoxy resin composition has been taught in my Canadian Patent Application S.N. 2,034,851 filed Jan. 24, 1991 and due to be laid open for public inspection on Jul. 25, 1992.

Although the above mentioned coating composition for non-porous substrate provides an abrasion resistant film having good freeze-release properties, it contains large amounts of organic solvents. Typical coating bath contains over 90% solvents such as chlorothene and toluene. Industry is moving away from coatings containing high levels of organic solvent and the development of a water based or water reducible coating for use as weatherstrip coating is highly desirable.

Water based silicone coatings such as paper releases and polishes are known and available. For example, a water based polish is taught by Traver et al in U.S. Pat. No. 4,600,436 issued Jul. 15, 1986 and assigned to General Electric Company. The polish, an amine functional silicone emulsion, is a reaction product of a diorganopolysiloxane fluid, an aminofunctional silane, a polymerization catalyst and water.

There is no teaching of a one step application for a water reducible silicone system for use as weatherstrip coating. It has been discovered that this water reducible weatherstrip coating has low coefficient of friction, good abrasion resistance and freeze release properties while avoiding the problems associated with the use of large amounts of solvent.

SUMMARY OF THE INVENTION

It is an object of the present invention to provide a water reducible coating composition which can be applied and cured to a non-porous surface such as EPDM based rubber to form a low friction, abrasion-resistant film having good freeze-release properties.

According to a broad aspect of the present invention, there is provided a water reducible coating composition for EPDM-based rubber comprising:

(A) an amine functional polysiloxane emulsion;
(B) a crosslinking composition comprising;
  (i) a methyl methoxypolysiloxane resin solution, and
  (ii) an organofunctional silane;
(C) a catalytic amount of an organometallic compound; and
(D) an effective amount of an emulsifying agent.

According to another aspect of the present invention, there is provided a water reducible coating composition for EPDM-based rubber comprising:

(A) an amine functional polysiloxane emulsion;
(B) a crosslinking composition comprising;
  (i) a methyl methoxypolysiloxane resin solution,
  (ii) an organofunctional silane,
  (iii) an emulsifying agent, and
  (iv) an organic solvent; and,
(C) a catalyst solution comprising:
  (v) an organometallic compound,
  (vi) an emulsifying agent, and
  (vii) an organic solvent; and wherein the crosslinking composition is blended with the amine functional polysiloxane emulsion in a ratio of from 1:3 to 3:1, and the catalyst solution is added in an amount ranging from about 2 to 10 parts per 100 parts by weight based on the combined weight of the amine functional polysiloxane emulsion and the crosslinking composition.

The amine functional polysiloxane emulsion (A) acts as the base emulsion in the coating of the present invention. The amine functional polysiloxane emulsion is taught by Traver et al in the aforementioned U.S. Pat. No. 4,600,436 and, in summary, is an emulsion polymerization reaction product of a relatively low molecular weight diorganopolysiloxane and an aminofunctional silane. A commercially available amine functional polysiloxane emulsion is SM2059 TM of General Electric which is a 35% silicone emulsion.

Composition (B) provides crosslinking, adhesion promotion and water repellency for the coating of the present invention and is comprised of a methyl methoxypolysiloxane resin solution and an organofunctional silane. In a preferred embodiment, composition (B) further comprises an emulsifying agent and an organic solvent.

The methyl methoxypolysiloxane (i) acts as a water repellent for the coating and is represented by the general formula:

where n ranges from ⅓ to 0.7. Preferably, n is in the range of from 0.4 to 0.5. The methyl methoxypolysiloxane is in solution in an organic solvent. U.S. Pat. No. 2,810,704 to Krantz et al issued Oct. 22, 1957 provides a more complete description of methyl methoxypolysiloxane resin solutions. A commercially available methyl methoxypolysiloxane resin solution is SR107 TM of General Electric which contains 60% active silicone in aromatic 150.

The organofunctional silane (ii) of crosslinking composition (B) acts as an adhesion promoter and crosslinker in the coating and is represented by the general formula:

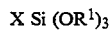

where $R^1$ is a monovalent hydrocarbon group having 1 to 4 carbon atoms and X is an organofunctional group such as for example vinyl, methacryloxy, glycidoxyalkyl, aminoalkyl or isocyanato. Examples of commonly employed organofunctional silanes include the following:

vinyltriethoxysilane (VTEO),
gamma-methacryloxypropyltrimethoxysilane (MEMO),
gamma-glycidoxypropyltrimethoxysilane (GLYMO),
gamma-aminopropyltriethoxysilane (AMEO),
N-beta-(aminoethyl)-gamma-aminopropyltrimethoxysilane (AEAPTM), or
isocyanatofunctional silane (ICYTEO).

The amount of organofunctional silane (ii) in composition (B) is in the range of from 10 to 50% based on active silicone solids. To extend the bath life of the coating the amount of organofunctional silane is preferably in the range of from 15 to 25% based on active silicone solids in composition (B).

The organometallic compound is added to the coating composition to serve to catalyse the condensation reaction during the curing process of the coating. In the preferred embodiment, the coating composition contains a catalyst solution (C) comprising an organometallic compound (v), an emulsifying agent (vi) and an organic solvent (vii). Organo tin compounds such as dibutyl tin dilaurate, tin octoate or dibutyl tin oxide are the preferred organometallic compounds. Other metallic salts such as zinc octoate, zirconium octoate or manganese naphthanate may be employed as the condensation catalyst but are not as effective in terms of cure speed. The organo tin compound is added in an amount effective to catalyse the condensation reaction as would be appreciated by those knowledgeable in the art. The amount of organo tin compound in the preferred embodiment of the present invention ranges from 30 to 50% by weight of the catalyst solution (C).

The water reducible coating composition of the present invention is made self-emulsifiable on the addition of water by incorporating an emulsifying agent which is represented by the general formula:

$$R^2-(O\ CH_2CH_2)_y OH$$

where $R^2$ is a nonylphenyl or an octylphenyl group or an alkyl group having 13 to 15 carbon atoms and y is in the range of from 4 to 40. Typical emulsifying agents which may be employed in the practise of the invention are the Triton TM line from Rohm & Haas such as Triton TM X405 and Triton TM N401 or Renex TM 36 from ICI. Combinations of such emulsifying agents may also be used. In the preferred embodiment, emulsifying agents are added to both the crosslinking composition (B) and the catalyst solution (C). An amount of emulsifying agent is used which will effect the formation of an emulsion upon the addition of water as would by understood by those skilled in the art. In the preferred embodiment, the emulsifying agent (iii) is added to composition (B) in an amount in the range of from 3 to 10% by weight based on composition (B) and the emulsifying agent (vi) is added in an amount ranging from 3 to 10% by weight of catalyst solution (C).

The water reducible coating composition of the present invention may be enhanced in its film forming properties by the addition of an effective amount of organic solvent. The organic solvent is one or more of an aliphatic hydrocarbon or an aromatic hydrocarbon such as aromatic 150, glycol ethers such as Dowanol TM DPM or a glycol ether/alcohol blend. The solvent may be partly originated from the methyl methoxypolysiloxane resin solution (i) in (B). In the preferred embodiment, organic solvent is included directly in the crosslinking composition (B) and the catalyst solution (C). In crosslinking composition (B), the organic solvent is preferably present in the range of from 35 to 60% by weight of composition (B). The organic solvent (vii) is present in the range of from 50 to 70% by weight of catalyst solution (C).

The coating bath is prepared by a method which will be appreciated by those skilled in the art. The amine functional polysiloxane emulsion (A) is blended with water in a ratio of 1:3 to 1:8 by weight. The actual quantity of water used is dependent on the applicator. Crosslinking composition (B) is then added and blended to complete dispersion. The blending ratio of (A) to (B) can be varied from 3:1 to 1:3. Catalyst solution (C) is then added in an amount ranging from 2 to 10 parts per 100 parts by weight based on the combined weight of (A) and (B) and the mixture is finally blended to complete dispersion.

Optimum performance of coatings based on the present invention necessitates application to clean, dry substrate. The curing of coatings based on this invention is dependent on time and temperature. The coating may be cured at room temperature in approximately 24 hours, however, cure is typically achieved by exposure to temperatures of 100° C. to 150° C. for 3 to 5 minutes.

The present invention is further illustrated by the following examples in which all parts are by weight.

SAMPLE PREPARATION

Various samples of the crosslinking composition (B) are prepared by blending the appropriate components as shown in Table 1.

TABLE 1

|  | B1 | B2 | B3 | B4 | B5 | B6 | B7 | B8 |
|---|---|---|---|---|---|---|---|---|
| SR107 | 48 | 86 | 32 | 48 | 48 | 48 | 48 | 48 |
| VTEO | — | — | — | 6 | — | — | — | — |
| MEMO | — | — | — | — | — | — | 6 | — |
| GLYMO | 6 | 6 | 20 | — | — | — | — | — |
| AMEO | — | — | — | — | 6 | — | — | — |
| AEAPTM | — | — | — | — | — | — | — | 6 |
| ICYEO | — | — | — | — | — | 6 | — | — |
| RENEX 36 | 8 | 8 | 8 | 8 | 8 | 8 | 8 | 8 |
| AROMATIC 150 | 38 | — | 40 | 38 | — | 38 | 38 | — |
| DOWANOL DPM/S-BuOH (25/75 blend) | — | — | — | — | 38 | — | — | 38 |

Various samples of the catalyst solution (C) are prepared according to Table 2.

TABLE 2

|  | C9 | C10 |
|---|---|---|
| Dibutyl tin oxide | 35 | — |
| Dibutyl tin dilaurate | — | 35 |
| Renex 36 | 5 | 5 |
| Aromatic 150 | 60 | 60 |

BATH PREPARATION

Various sample bath compositions are prepared as shown in Table 3.

TABLE 3

|  | SB1 | SB2 | SB3 | SB4 | SB5 | SB6 | SB7 | SB8 | SC10 | SA11 | SA12 |
|---|---|---|---|---|---|---|---|---|---|---|---|
| Water | 40 | 40 | 40 | 40 | 40 | 40 | 40 | 40 | 40 | 40 | 40 |
| SM2059 | 10 | 10 | 10 | 10 | 10 | 10 | 10 | 10 | 10 | 15 | 5 |
| B1 | 10 | — | — | — | — | — | — | — | 10 | 5 | 15 |
| B2 | — | 10 | — | — | — | — | — | — | — | — | — |
| B3 | — | — | 10 | — | — | — | — | — | — | — | — |
| B4 | — | — | — | 10 | — | — | — | — | — | — | — |
| B5 | — | — | — | — | 10 | — | — | — | — | — | — |
| B6 | — | — | — | — | — | 10 | — | — | — | — | — |
| B7 | — | — | — | — | — | — | 10 | — | — | — | — |
| B8 | — | — | — | — | — | — | — | 10 | — | — | — |
| C9 | 1 | 1 | 1 | 1 | 1 | 1 | 1 | 1 | — | 1 | 1 |
| C10 | — | — | — | — | — | — | — | — | 1 | — | — |

The prepared bath compositions SB1 to SB8, SC10, SA11 and SA12 are independently spray applied to 60 Durometer EPDM rubber sheets of 3 mm thickness and allowed to cure at 150° C. for 3 minutes to provide sample coatings for analysis. Coating thickness is in the range of 2 to 5 microns.

An A.A.T.C.C. model CM-5 crockmeter of Atlas Electronic Devices Company is used as a means of evaluating the resistance of the sample coatings to removal by abrasion. The abrasion medium is modified and is a 12.5 mm round-bottom glass finger. The finger rests on the coated EPDM sample with a pressure of 900 g and inscribes a straight path 10 cm long. The meter is equipped with an electric motor operating at 60 revolutions per minute and an automatic shutdown counter. The number of cycles at which the first appearance of destruction of the rubber surface is recorded and is used as a measure of resistance to the removal by abrasion.

The coefficient of friction is determined modeling ASTM D1894. An Instron Tensiometer is fitted with an assembly for CoF measurements. Two strips (12×125 mm) of coated EPDM rubber are wrap-mounted longitudinally on the sled close to the sides parallel to the direction of motion of the machine. The dimensions of the sled are 63.5×63.5 mm with a weight of 250 g. The CoF is measured against a glass surface which is mounted on the plane.

The freeze-release properties of the sample coating compositions are also examined. A column of ice is formed on each coated EPDM rubber sheet through the use of an inverted Teflon cup of diameter 16 to 17 mm (e.g. Teflon stoppers, joint neck size 24/40, full length hollow, Fisher Scientific) in a freezer at −15° to −20° C. overnight. The rubber sheet is premounted on a jig assembly that is to be attached to an Instron Tensiometer for adhesion measurements.

The results of the coating analysis are shown in Table 4. The favorable characteristics of the coating composition of the present invention are evident.

(i) a methyl methoxypolysiloxane resin solution, and (ii) an organofunctional silane of the general formula:

$$XSi(OR^1)_3$$

where $R^1$ is a monovalent hydrocarbon having from 1 to 4 carbon atoms and X is an organofunctional group;

(C) a catalytic amount of a catalytic organometallic compound; and (D) an effective amount of an emulsifying agent sufficient to emulsify the composition.

2. The water reducible coating composition as claimed in claim 1 wherein there is additionally an effective amount of organic solvent to enhance the film forming property of the coating.

3. The water reducible coating composition as claimed in claim 1 wherein the methyl methoxypolysiloxane in the methyl methoxypolysiloxane resin solution is represented by the general formula:

$$CH_3(OCH_3)_n O_{(3-n)/2}$$

where n ranges from ⅓ to 0.7 and is solubilized in an organic solvent.

4. The water reducible coating composition as claimed in claim 3 wherein n ranges from 0.4 to 0.5.

5. A water reducible coating composition as claimed in claim 1 wherein the organofunctional silane in composition (B) is in the range of from 10 to 25% by weight based on the active silicone solids.

6. A water reducible coating composition as claimed in claim 1 wherein the organofunctional silane in composition (B) is in the range of from 15 to 25% by weight based on the active silicone solids.

7. A water reducible coating composition as claimed in claim 5 wherein the organofunctional silane is gamma-glycidoxypropyltrimethoxysilane.

8. A water reducible coating composition as claimed

TABLE 4

|  | SB1 | SB2 | SB3 | SB4 | SB5 | SB6 | SB7 | SB8 | SC10 | SA11 | SA12 | UNCOATED |
|---|---|---|---|---|---|---|---|---|---|---|---|---|
| ABRASION RES. (CYCLE) | 1300 | 1100 | 300 | 900 | 1400 | 2000 | 1200 | 1000 | 1200 | 600 | 1000 | 20 |
| CoF | 0.24 | 0.18 | 0.22 | 0.18 | 0.30 | 0.29 | 0.18 | 0.27 | 0.22 | 0.24 | 0.20 | 2.83 |
| FREEZE RELEASE (kPa) | 294 | 435 | 325 | 218 | 359 | 294 | 347 | 250 | 239 | 372 | 229 | 848 |

The embodiments of the invention in which an exclusive property or privilege is claimed are defined as follows:

1. A water reducible coating composition for EPDM-based rubber comprising:
(A) an amine functional polysiloxane emulsion;
(B) a cross-linking composition comprising:

in claim 5 wherein the organofunctional silane is gamma-methacryloxypropyltrimethoxysilane.

9. A water reducible coating composition as claimed in claim 5 wherein the organofunctional silane is isocyanatofunctional silane.

10. A water reducible coating composition as claimed in claim 1 wherein the emulsifying agent is represented by the general formula:

$$R^2-(O\ CH_2CH_2)_y OH$$

where $R^2$ is a nonylphenyl or an octylphenyl group or an alkyl group having 13 to 15 carbon atoms and y ranges from 4 to 40.

11. A water reducible coating composition as claimed in claim 1 wherein the organometallic compound is an organo tin compound.

12. A water reducible coating composition as claimed in claim 1 wherein the crosslinking composition is present with the amine functional polysiloxane emulsion in a ratio of from 1:3 to 3:1.

13. A water reducible coating composition for EPDM-based rubber comprising a mixture of three emulsions:
(A) an amine functional polysiloxane emulsion;
(B) a cross-linking emulsion comprising
  (i) a methyl methoxypolysiloxane resin solution, and
  (ii) an organofunctional silane of the general formula:

$$XSi(OR^1)_3$$

where $R^1$ is a monovalent hydrocarbon having from 1 to 4 carbon atoms and X is an organofunctional group;
  (iii) an emulsifying agent; and
  (iv) an organic solvent; and
(C) a catalyst emulsion comprising:
  (v) a catalytic organometallic compound,
  (vi) an emulsifying agent, and
  (vii) an organic solvent; and
the crosslinking emulsion is blended with the amine functional polysiloxane emulsion in a ratio of from 1:3 to 3:1, and the catalyst emulsion is present in an amount ranging from about 2 to 10 parts per 100 parts by weight based on the combined weight of the amine functional polysiloxane emulsion and the crosslinking composition.

14. The water reducible coating composition as claimed in claim 13 wherein the amount of organofunctional silane in the crosslinking composition is 10 to 50% by weight based on active silicone solids.

15. The water reducible coating composition as claimed in claim 13 wherein the amount of organofunctional silane in the crosslinking composition is 15 to 25% by weight based on active silicone solids.

16. The water reducible coating composition as claimed in claim 13 wherein the amine functional polysiloxane emulsion is an emulsion polymerization reaction product of a relatively low molecular weight diorganopolysiloxane and an aminofunctional silane.

17. The water reducible coating composition as claimed in claim 14 wherein the methyl methoxypolysiloxane resin solution is represented by the general formula:

$$CH_3Si\ (OCH_3)_n O_{(3-n)/2}$$

where n ranges from 1/3 to 0.7 and is solubilized in an organic solvent.

18. The water reducible coating composition as claimed in claim 17 wherein n ranges from 0.4 to 0.5.

19. The water reducible coating composition as claimed in claim 14 wherein the organofunctional silane is represented by the general formula:

$$X\ Si\ (OR^1)_3$$

where $R^1$ is a monovalent hydrocarbon group having 1 to 4 carbon atoms and X is an organofunctional group.

20. The water reducible coating composition as claimed in claim 19 wherein the organofunctional silane is gamma-glycidoxypropyltrimethoxysilane.

21. A water reducible coating composition as claimed in claim 19 wherein the organofunctional silane is gamma-methacryloxypropyltrimethoxysilane.

22. A water reducible coating composition as claimed in claim 19 wherein the organofunctional silane is isocyanatofunctional silane.

23. The water reducible coating composition as claimed in claim 13 wherein the emulsifying agent in the crosslinking composition and the emulsifying agent in the catalyst solution are represented by the same general formula:

$$R^2-(O\ CH_2CH_2)_y OH$$

where $R^2$ is a nonylphenyl or an octylphenyl group or an alkyl group having 13 to 15 carbon atoms and y ranges from 4 to 40.

24. The water reducible coating composition as claimed in claim 23 wherein the emulsifying agent in the crosslinking composition is present in an amount in the range of from 3 to 10% by weight based on the weight of crosslinking composition.

25. The water reducible coating composition as claimed in claim 23 wherein the emulsifying agent in the catalyst solution is present in an amount in the range of from 3 to 10% by weight based on the weight of catalyst solution.

26. The water reducible coating composition as claimed in claim 13 wherein the organic solvent of the crosslinking composition is present in the range of from 35 to 60% by weight based on the weight of the crosslinking composition.

27. The water reducible coating composition as claimed in claim 13 wherein the organic solvent of the catalyst solution is present in the range of from 50 to 70% by weight based on the weight of the catalyst solution.

28. The water reducible coating composition as claimed in claim 13 wherein the organometallic compound is an organo tin compound and is present in an amount effective to catalyse a condensation reaction.

29. The water reducible coating composition as claimed in claim 13 wherein the organometallic compound is an organo tin compound and is present in the range of from 30 to 50% by weight based on the weight of the catalyst solution.

30. A water reducible coating composition comprising a mixture of three emulsions:
(A) an amine functional polysiloxane emulsion;
(B) a crosslinking emulsion composition comprising;
  (i) a methyl methoxypolysiloxane resin represented by the general formula:

$$CH_3Si(OCH_3)nO_{(3n-2)/2}$$

where n ranges from 0.4 to 0.5 in solution in an organic solvent, (ii) gamma-glycidoxypropyltrimethoxysilane, wherein the amount of gamma-glycidoxypropyltrimethoxysilane in the crosslinking composition is 15 to 25% by weight based on active silicone solids, (iii) an emulsifying agent represented by the general formula:

$$R^2(OCH_2CH_2)_yOH$$

where $R^2$ is a nonylphenyl or an octylphenyl group or an alkyl group having 13 to 15 carbon atoms and y ranges from 4 to 40, wherein the emulsifying agent is present in an amount in the range of from 3 to 10% by weight based on the crosslinking composition, and (iv) an organic solvent present in the range of from 35 to 60% by weight based on the weight of the crosslinking composition; and (C) a catalyst emulsion comprising;

(i) an organo tin compound selected from the group consisting of dibutyltin dilaurate, tin octoate, and dibutyl tin oxide present in the range of from 30 to 50% by weight based on the weight of the catalyst solution, (ii) an emulsifying agent as defined herein before present in the range of from 3 to 10% by weight based on the catalyst solution, and (iii) an organic solvent present in the range of from 50 to 70% by weight of catalyst solution;

wherein the amine functional polysiloxane emulsion is present with water in a ratio of 1:3 to 1:8 by weight, the crosslinking emulsion is present with the amine functional polysiloxane emulsion in a ratio of from 1:3 to 3:1, and the catalyst emulsion is present in an amount ranging from about 2 to 10 parts per 100 parts by weight based on the weight of the amine functional polysiloxane emulsion and the crosslinking composition.

31. A structure made of EPDM-based rubber coated with the water reducible coating composition of claim 1.

* * * * *